United States Patent
Fulmer et al.

(10) Patent No.: US 9,297,578 B2
(45) Date of Patent: Mar. 29, 2016

(54) CURRENT LIMIT CONTROL ON A TRANSPORT REFRIGERATION SYSTEM

(75) Inventors: Scott D. Fulmer, Liverpool, NY (US); Donald B. Hotaling, Jamesville, NY (US); Mark J. Perkovich, Fayetteville, NY (US)

(73) Assignee: CARRIER CORPORATION, Farmington, CT (US)

( * ) Notice: Subject to any disclaimer, the term of this patent is extended or adjusted under 35 U.S.C. 154(b) by 317 days.

(21) Appl. No.: 13/989,089

(22) PCT Filed: Nov. 7, 2011

(86) PCT No.: PCT/US2011/059528
§ 371 (c)(1),
(2), (4) Date: May 23, 2013

(87) PCT Pub. No.: WO2012/071159
PCT Pub. Date: May 31, 2012

(65) Prior Publication Data
US 2013/0247598 A1 Sep. 26, 2013

Related U.S. Application Data

(60) Provisional application No. 61/417,008, filed on Nov. 24, 2010.

(51) Int. Cl.
*F25D 21/00* (2006.01)
*F25D 29/00* (2006.01)
(Continued)

(52) U.S. Cl.
CPC .............. *F25D 29/00* (2013.01); *B60H 1/3225* (2013.01); *B60H 1/3232* (2013.01); *F25B 49/025* (2013.01); *F25D 29/003* (2013.01); *F25B 2700/15* (2013.01)

(58) Field of Classification Search
CPC .... B60H 1/321; B60H 1/3225; B60H 1/3232; B60H 2001/3238; B60H 2001/3255; B60H 1/327
See application file for complete search history.

(56) References Cited

U.S. PATENT DOCUMENTS

| 4,219,071 A | 8/1980 | Careglio et al. |
| 6,223,546 B1 | 5/2001 | Chopko et al. |

(Continued)

FOREIGN PATENT DOCUMENTS

WO 2012071159 A1 5/2012

OTHER PUBLICATIONS

Notification of Transmittal of the International Preliminary Report on Patentability of the International Searching Authority, or the Declaration; PCT/US2011/059528; Jun. 6, 2013.
(Continued)

*Primary Examiner* — Jonathan Bradford
*Assistant Examiner* — Elizabeth Martin
(74) *Attorney, Agent, or Firm* — Cantor Colburn LLP

(57) ABSTRACT

A method for controlling the operation of a transport refrigeration system to limit current drawn by a compressor powered by AC electric current includes the steps of: (a) determining whether an ambient temperature in which the refrigeration unit is operating has been greater than a set point ambient temperature for a first time period; (b) determining whether the refrigeration unit has been operating in a temperature pulldown mode; (c) determining whether the AC electric current is equal to or exceeds a preset maximum current limit; (d) determining whether a time period between a last defrost cycle and a next previous defrost cycle is less than fifteen minutes; and (e) if the determination is YES in both of step (a) and step (b) and is also YES in at least one of step (c) and step (d), reducing the preset maximum current limit to a reset maximum current limit.

10 Claims, 4 Drawing Sheets

(51) Int. Cl.
*B60H 1/32* (2006.01)
*F25B 49/02* (2006.01)

(56) References Cited

U.S. PATENT DOCUMENTS

2002/0162344 A1* 11/2002 Reason et al. .................. 62/217
2006/0248904 A1* 11/2006 Ludwig ........................... 62/151
2010/0289273 A1* 11/2010 Steele et al. ................ 290/40 B

OTHER PUBLICATIONS

Notification of Transmittal of the International Search Report of the International Searching Authority, or the Declaration; PCT/US2011/059528; Apr. 18, 2012.
Notification of Transmittal of the Written Opinion of the International Searching Authority, or the Declaration; PCT/US2011/059528; Apr. 18, 2012.

* cited by examiner

CURRENT LIMIT CONTROL ON A TRANSPORT REFRIGERATION SYSTEM

CROSS-REFERENCE TO RELATED APPLICATION

Reference is made to and this application claims priority from and the benefit of U.S. Provisional Application Ser. No. 61/417,008, filed Nov. 24, 2010, entitled "Current Limit Control on a Transport Refrigeration System", which application is incorporated herein in its entirety by reference.

FIELD OF THE INVENTION

This invention relates generally to transport refrigeration units and, more specifically, to limiting the current draw during operation of a transport refrigeration system during the pull down of the temperature of product when loaded into a transport container provided with a refrigeration unit.

BACKGROUND OF THE INVENTION

Truck trailers used to transport perishable goods include a refrigerated trailer pulled behind a track cab unit. The refrigerated trailer, which houses the perishable cargo, requires a refrigeration unit for maintaining a desired temperature environment within the interior volume of the container. The refrigeration unit must have sufficient refrigeration capacity to maintain the product stored within the trailer at the desired temperature over a wide range of ambient air temperatures and load conditions. Refrigerated trailers of this type are used to transport a wide variety of products, ranging for example from freshly picked produce to deep frozen seafood. Product may be loaded into the trailer unit directly from the field, such as freshly picked fruits and vegetables, or from a warehouse.

Conventional transport refrigeration systems used in connection with truck trailers include a refrigeration unit operatively associated with the trailer. The refrigeration unit includes a refrigerant compressor, a condenser coil, an expansion device, commonly a thermostatic expansion valve (TXV), and an evaporator coil connected via appropriate refrigerant lines in a closed refrigerant flow circuit. The refrigeration unit is generally contained in a framework that is attached to the front wall of the trailer behind the truck cab such that the air or gas/air mixture or other gas within the interior volume of the trailer may be circulated over the evaporator coil by means of an evaporator fan associated with the evaporator coil which is disposed within the interior of the trailer, typically mounted in an opening in the front wall to which the refrigeration unit is attached. The transport refrigeration system also includes an electric generator driven by a diesel powered engine and adapted to produce AC current at a selected voltage and frequency to operate a compressor drive motor driving the refrigeration compressor. For example, U.S. Pat. No. 6,223,546 discloses a transport refrigeration unit configured to be mounted on the front wall of a refrigerated transport trailer.

Generally, products loaded into a trailer from a warehouse have already been cooled to the desired product storage temperature within a refrigeration facility at the warehouse. When the chilled products have been transferred into the trailer, the trailer doors are closed and the refrigeration unit is operated in a "pulldown" mode to rapidly reduce the air temperature within the trailer from ambient or near ambient temperature down to the desired product storage temperature for transport. In conventional practice, the refrigeration unit is typically designed with a refrigeration capacity sized to provide stable temperature at a low box temperature desired for a frozen product and even a deep frozen product, which would be at least as low as 0° C. (32° F.) and as low as −18° C. (about 0° F.) for a deep frozen product.

However, when product which has not been pre-cooled, such as for example fresh fruits and vegetables direct from the field, is loaded into the trailer "hot", that is at an ambient temperature above the desired product storage temperature, such as for example directly from the field at ambient outdoor temperature, a substantial refrigeration load is imposed upon the transport refrigeration unit operating in the pulldown mode to not only reduce the temperature of the air within the trailer interior, but also to reduce the temperature of the product down from ambient outdoor temperature to the desired product storage temperature. Products loaded "hot" require the refrigeration unit to pull the product temperature down to set point temperature, typically about 2° C. (about 36° F.) from product temperatures ranging as high as 38° C. (100° F.) or above.

During pull down, the refrigerant unit requires high refrigerant mass flow to cool the trailer interior and the product down as rapidly as possible. Thus, the refrigerant compressor must operate at or near its maximum load capacity. With the refrigerant compressor operating at or near its load capacity, particularly when the ambient outdoor temperature is high, the risk exists that the electric current drawn by the refrigerant compressor may exceed the maximum current limit.

SUMMARY OF THE INVENTION

In an aspect of the invention, a method is provided for controlling the operation of a transport refrigeration system to limit current drawn by the refrigerant compressor. A method of operating a transport refrigeration unit having a compressor powered by AC electric current to limit current draw by the compressor, includes the steps of: (a) determining whether an ambient temperature in which the refrigeration unit is operating has been greater than a set point ambient temperature for a first time period; (b) determining whether the refrigeration unit has been operating in a temperature pulldown mode; (c) determining whether the AC electric current is equal to or exceeds a preset maximum current limit; (d) determining whether a time period between a last defrost cycle and a next previous defrost cycle is less than fifteen minutes; and (e) if the determination is yes in both of step (a) and step (b) and is also yes in at least one of step (c) and step (d), reducing the preset maximum current limit to a first reset maximum current limit. The step of reducing the preset maximum current limit to a first reset maximum current limit may comprise reducing the preset maximum current limit by 0.5 amps.

The method may include the further the steps of: (f) starting a timer at a time t equals zero; (g) when the time t is equal to or greater than a first time t1, determining whether the AC electric current is equal to or exceeds a preset maximum current limit; (h) if the AC electric current is equal to or exceeds a preset maximum current limit, reducing the first reset maximum current limit to a second reset maximum current limit; and (i) restarting the timer at a time t equals zero. The step of reducing the first reset maximum current limit to a second reset maximum current limit may comprise reducing the first reset maximum current limit by 0.5 amps.

In an embodiment, the method may include the further step of repeating steps (f) through step (i) until at the completion of the last step (h) to be completed the then reduced reset maximum current limit is three amps less than the preset maximum current level. The reset maximum current level may be reduced by 0.5 amps at each repetition of step (h).

The method may include the further step of resetting the reduced reset maximum current limit to the preset maximum current level if, upon deactivation of the refrigeration unit: the refrigeration unit is exiting operation in a pulldown mode; or the refrigeration unit has been deactivated in response to a shutdown alarm; or the refrigeration unit is entering a standby mode; or the ambient temperature in which the refrigeration unit is operating has been less than the set point ambient temperature for a second time period.

BRIEF DESCRIPTION OF THE DRAWINGS

For a further understanding of the disclosure, reference will be made to the following detailed description which is to be read in connection with the accompanying drawing, where.

DETAILED DESCRIPTION OF THE INVENTION

Figure 1:
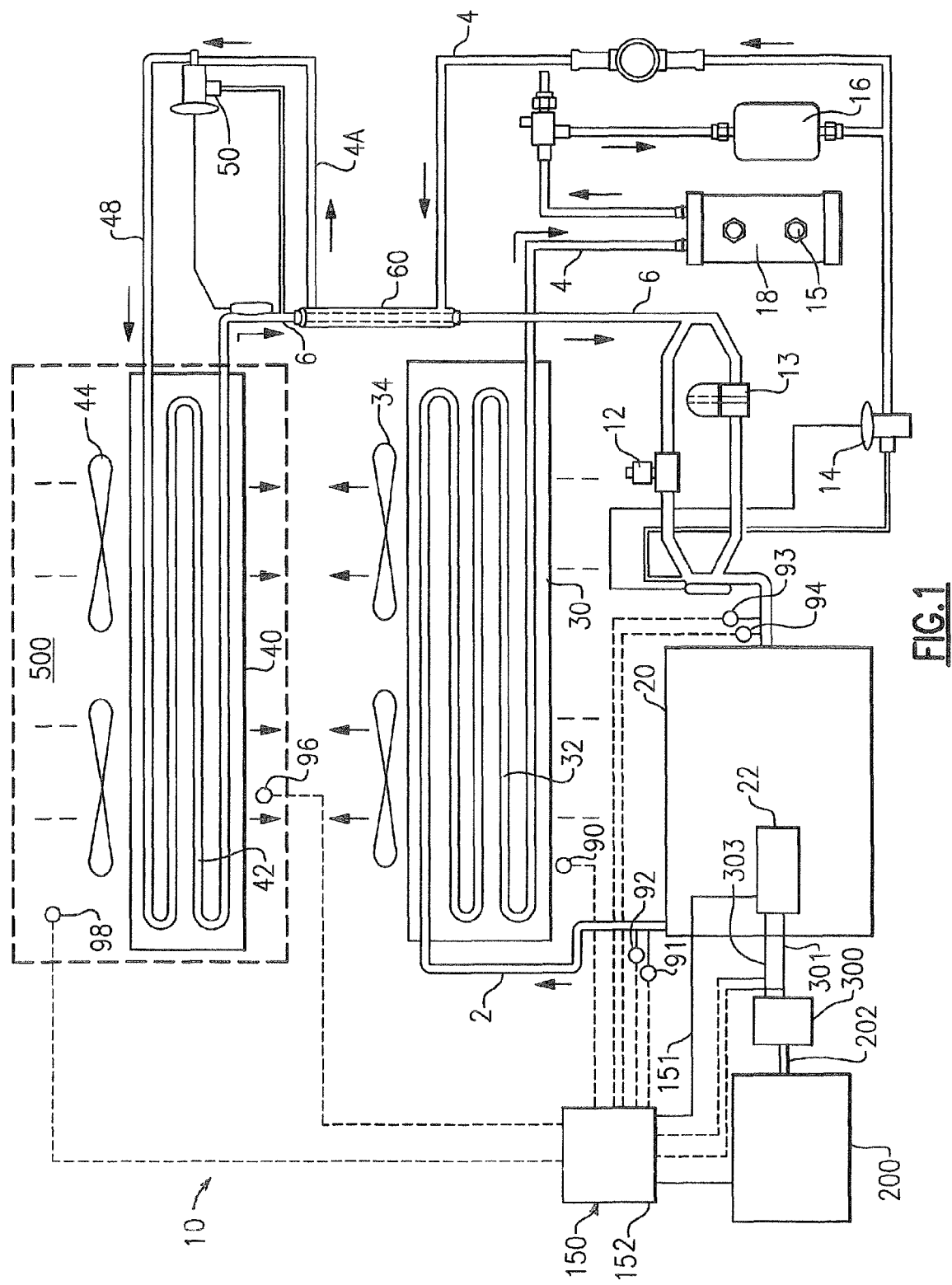
FIG. 1 is a schematic representation of an exemplary embodiment of a transport refrigeration unit with a current control system.

Referring now to FIG. 1, there is shown schematically, an exemplary embodiment of a transport refrigeration system including a prime mover 200, a electric generator 300 operatively associated with the prime mover 200, and a transport refrigeration unit 10. The transport refrigeration unit 10 functions to regulate and maintain a desired product storage temperature range within a refrigerated volume wherein a perishable product is stored during transport, such as a refrigerated box of a trailer. In each of the depicted embodiments, the refrigeration unit 10 includes a compressor 20, a condenser 30 including a condenser heat exchange coil 32 and associated condenser fan(s) 34, an evaporator heat exchanger 40 including an evaporator heat exchanger coil 42 and associated evaporator fan(s) 44, and an evaporator thermal expansion valve (TXV) 50 connected in a conventional manner by refrigerant lines 2, 4 and 6 in a refrigerant flow circuit. Typically, the compressor 20 is a reciprocating compressor or a scroll compressor, single-stage or two-stage; however, the particular type of compressor used is not germane to or limiting of the invention.

Refrigerant line 2 connects the discharge outlet of the compressor 20 in refrigerant flow communication with the inlet to the condenser heat exchanger coil 32, refrigerant line 4 connects the outlet of the condenser heat exchanger coil 32 in refrigerant flow communication with the inlet to the evaporator heat exchanger coil 42, and refrigerant line 6 connects the outlet of the evaporator heat exchanger coil 42 in refrigerant flow communication with the suction inlet of the compressor 20, thereby completing the refrigerant flow circuit. As depicted in the exemplary embodiment illustrated in FIG. 1, a refrigerant-to-refrigerant in-line heat exchanger 60 may be included in the refrigerant flow circuit for passing the liquid refrigerant passing through refrigerant line 4 in heat exchange relationship with the vapor refrigerant passing through refrigerant line 6. In addition, a suction modulation valve 12, a suction solenoid valve 13, a quench expansion valve 14, a filter/drier 16, and a receiver 18 with slight glass 15 may be included in the refrigerant circuit as in conventional practice.

An electric compressor drive motor 22 drives the refrigeration compressor 20. The electric compressor drive motor 22 may be interconnected to a drive shaft associated with the compression mechanism of the compressor 20 and may be housed with the compressor 20 in a sealed housing. The electric compressor drive motor 22 is driven by electric current supplied by means of the electric generator 300, which in turn is driven by the prime mover 200. The prime motor 200 may be diesel-powered engine or a gas-powered engine. In an embodiment, the prime mover may comprise a four cylinder, 2200 cc displacement diesel-powered engine. The generator 300 may be configured to produce both two-phase, 230-volt power to drive the electric compressor drive motor 22, as well as single phase, 115 volt power to supply electric current to other components of the refrigerant unit. In an embodiment, the electric generator 300 may comprise a synchronous generator coupled directly to the drive shaft 202 of the prime mover 200, as such disclosed in U.S. Pat. No. 6,223,546, assigned to Carrier Corporation, the entire disclosure of which is hereby incorporated by reference. The synchronous generator may be configured to have an output frequency of 65 Hz at an engine speed of 1950 r.p.m. an output frequency of 45 Hz at an engine speed of 1350 r.p.m., or other output frequency at another engine speed, as desired.

The refrigeration unit also includes an electronic controller 150 which controls the operation of various components of the refrigeration system. The electronic controller 150 may include a microprocessor 152 with its associated memory. In an embodiment, the electronic controller 150 may comprise a microprocessor controller such as, by way of example, but not limitation, a MicroLink™ controller available from Carrier Corporation of Syracuse, N.Y., USA. The electronic controller 150 is configured to operate the refrigeration unit 10 to maintain a predetermined thermal environment within the enclosed interior volume, i.e. the cargo box, of the trailer wherein the product is stored. The electronic controller 150 maintains the predetermined environment by selectively controlling the operation of the compressor 20, the condenser fan(s) 34 associated with the condenser heat exchanger coil 32, the evaporator fan(s) 44 associated with the evaporator heat exchanger coil 42, and various valves, such as suction modulation valve 12 and suction solenoid valve 13. For example, when cooling of the environment within the box is required, the electronic controller 150 switches AC electrical current from the generator 300 to the compressor drive motor 22 to activate the drive motor 22 and power the compressor 20, as well as separately powering the motors associated with the condenser fan(s) 34 and the evaporator fan(s) 44.

To facilitate control of the refrigeration unit 10, the controller 150 also monitors operating parameters at various points in the refrigeration system through a plurality of sensors and transducers. Among the sensors and transducers that may be provided include, among others not specifically shown: an ambient air temperature sensor 90 which inputs into the microprocessor 152 a variable resistance value indicative of the ambient air temperature in front of the condenser 30; a compressor discharge pressure transducer 91 which inputs into the microprocessor 152 a variable voltage indicative of the refrigerant discharge pressure; a compressor discharge temperature sensor 92 which inputs into the microprocessor 152 a variable resistance value indicative of the refrigerant discharge temperature; a compressor suction pressure transducer 93 which inputs into the microprocessor 152 a variable voltage indicative of the compressor suction refrigerant pressure; a compressor suction temperature sensor 94 which inputs into the microprocessor 152 a variable resistance value indicative of the compressor suction refrigerant temperature; a return air temperature sensor 96 which inputs into the microprocessor 152 a variable resistance value indicative of the temperature of the air leaving the evaporator 40 to return to the cargo box 500; and a box air temperature sensor 98 which inputs into the microprocessor 152 a variable resistance value indicative of the temperature of the air within the cargo box 500, i.e. the product storage temperature. The aforementioned sensors and transducers are merely examples of some of the various sensors/transducers that may be associated with the refrigeration unit 10, and is not meant to limit the type of sensors or transducers that may be included.

As noted previously, the generator 300 supplies two-phase AC current to power the compressor motor 22 to drive the compressor 20. The controller 150 monitors the amperage of each of the AC currents 301 and 303 of the two-phase power supplied to the compressor motor 22. The power consumed by the compressor 20 during operation varies directly with the mass flow rate of the refrigerant output by the compressor 20. The mass flow rate of the refrigerant output by the compressor 20 varies directly with the refrigeration load upon the compressor 20. The refrigeration load on the compressor 20 depends upon a number of factors, including the ambient outdoor temperature, TAM, and the box temperature, TBX, that is the temperature being maintained within the interior of the trailer, i.e. the cargo box, wherein the product being transported is stored. Thus, the amperage of the AC currents 301 and 302 are an indirect measurement of the power being consumed. If the respective amperages of the AC currents 301, 303 exceed a predetermined maximum amperage, it is an indication that the refrigeration load on the compressor 20 is above the desired operating refrigeration capacity of the compressor 20.

Figure 2A:
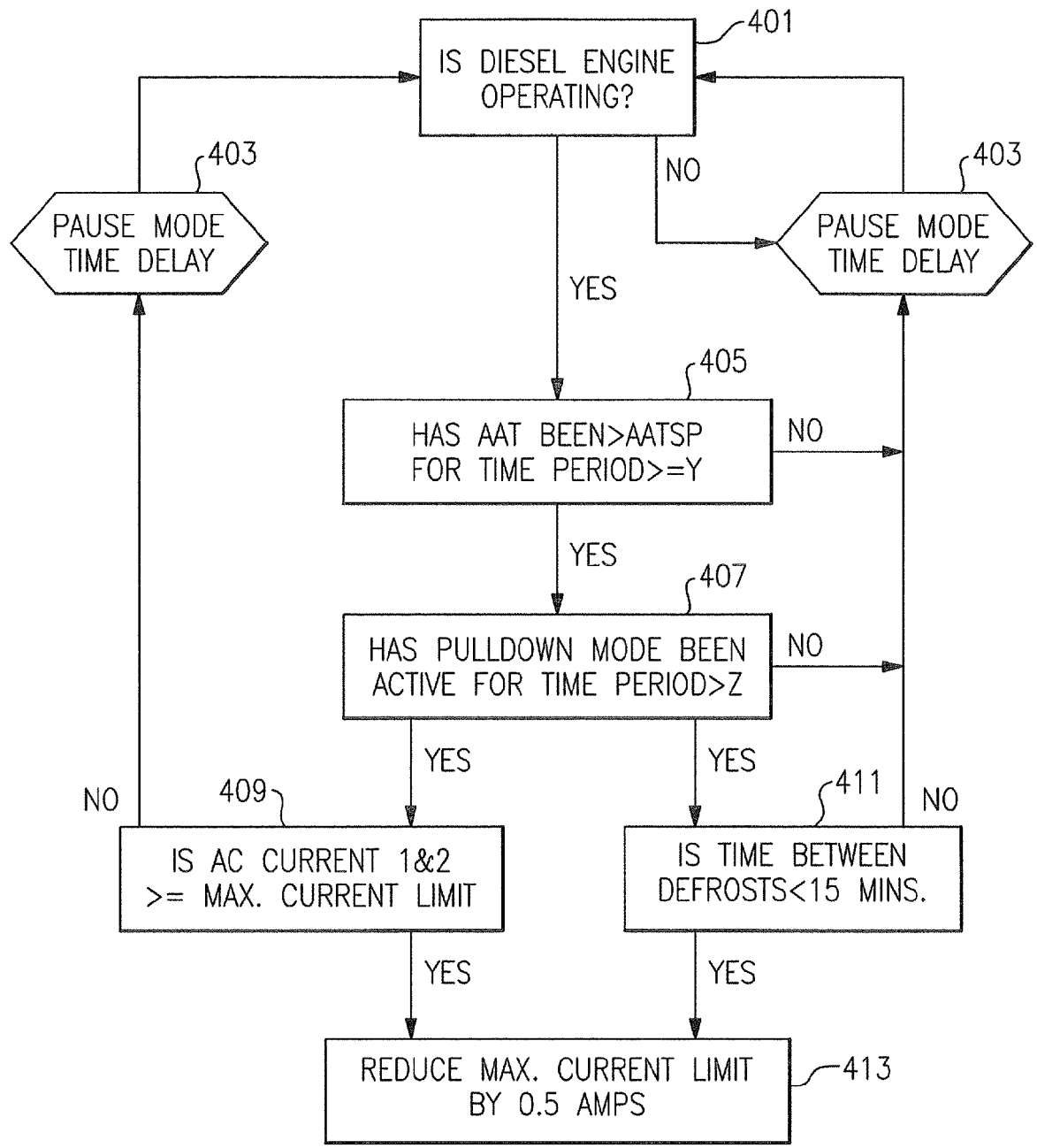
FIGS. 2a, 2b, 2c are block diagrams collectively presenting a flow chart illustrating an exemplary embodiment of the method for controlling current draw during operation of a transport refrigeration system as disclosed herein.

The controller 150 controls the operation of the transport refrigeration system 100 and the refrigeration unit 10 to limit the current drawn by the compressor drive motor 22 to prevent damage to the compressor 20 or the compressor drive motor 22 that might result from operation at or above maximum rated operating refrigeration capacity of the compressor over an extended period of time. The controller 150 monitors the operational status of the prime mover 200, the operational status of the refrigeration unit 10, the ambient air temperature (AAT), the amperage of the AC currents 310 and 303, and the time between defrost cycles of the evaporator coils 42 of the evaporator 40. Referring now to FIG. 2a, at 401, the controller 150 first checks to verify that the diesel engine 200, i.e. the prime mover, is operating. If not, the controller simply transitions into a pause mode at 403 for a period of time before again checking the operational status of the diesel engine. If the diesel engine is indeed operating, the controller proceeds to step 405 and determines whether the ambient temperature (AAT) in the environment in which the refrigeration unit is operating has been greater than a preselected set point ambient temperature (AATSP), for example typically in the range of 80 to 120 degrees F. (27 to 49 degrees C.), for a preset first time period, Y, for example typically in the range of two to four hours. If the ambient air temperature has not exceeded the set point ambient temperature for the preset first time period, the controller 150 simply transitions into the pause mode at step 403.

However, if the ambient temperature (AAT) in the environment in which the refrigeration unit is operating has indeed been greater than the preselected set point ambient temperature (AATSP) for the first time period, Y, the controller 150 proceeds to 407 and determines whether the refrigeration unit has been operating in a temperature pulldown mode for a preset second time period, Z, for example typically in the range of one to two hours. If not, the controller 150 simply transitions into the pause mode at 403. If the refrigeration unit has indeed been operating in a pulldown mode for a period of time greater than Z, the controller proceeds to each of 409 and 411. At 409, the controller 150 determines whether the AC electric current 301, 303 is equal to or exceeds a preset maximum current limit, for example typically an amperage in the range of 22 to 25 amperes. At 411, the controller 150 determines whether the time period between the last defrost cycle of the evaporator coil 42 of the evaporator 40 and the next previous defrost cycle thereof is less than a preset third time period, for example a time period of fifteen (15) minutes. If the either or both of the determinations at 409 and 411 is/are YES, then the controller proceeds to 413, at which the controller reduces the preset maximum current limit to a lower first reset maximum current limit. In an embodiment, the controller 150 reduces the preset maximum current limit by 0.5 amps. If both of the determinations at 409 and 411 are NO, the controller 150 simply transitions to the pause mode at 403 before again initiating the method at 401.

Figure 2B:
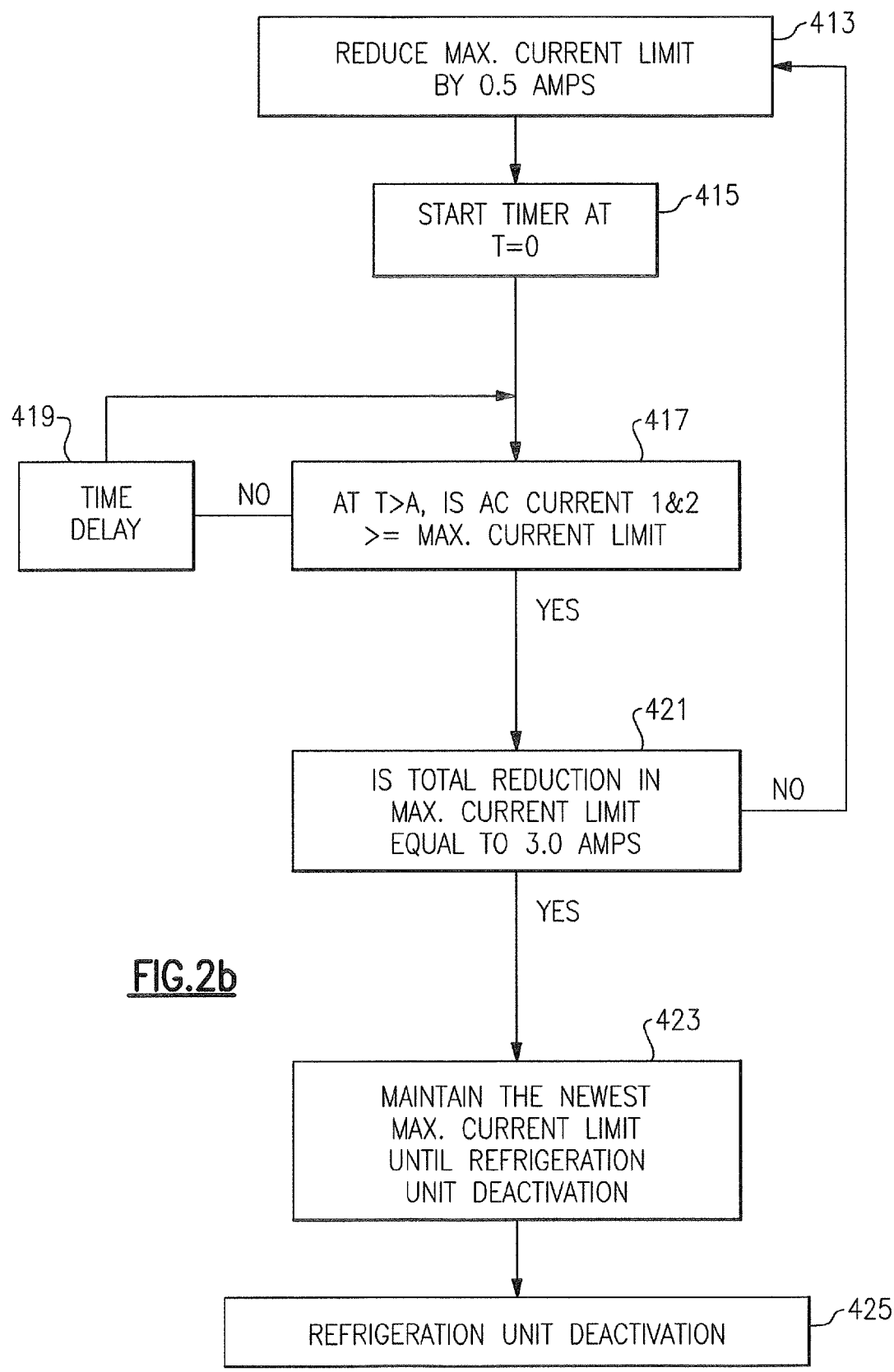

Referring now to FIG. 2b, the preset maximum current limit having been reduced at 413, the controller 150 next, at 415, sets a timer at time, t, equals zero. After a time period, at t=A, the controller 150 at 417 determines whether the AC electric current 301, 303 is equal to or exceeds the reset maximum current limit. If the determination at 417 is NO, that is the amperage of the AC currents 310, 303 are both less than the reset maximum current limit, the controller 150 proceeds to 419, at which the controller 150 pauses for a specified time period before again proceeding to 417. If the determination at 417 is YES, that is the AC currents 310, 303 are equal to or exceed the reset maximum current level, the controller 150 proceeds, at 421, to determine whether the total reduction in maximum current limit has reached a specified maximum reduction, for example, a reduction of three (3.0) amps relative to the initial preset maximum current limit. If the determination is NO, that is the maximum reduction has not been reached, the controller 150 further reduces the last value for reset maximum current limit, resets the timer, at 415, to t=0, and again proceeds through steps 417 to 421. This current limit reduction loop is repeated several times until, at 421, the total reduction in maximum current limit has reached the specified maximum reduction. In the exemplary embodiment of the method depicted in FIGS. 2a-2c, the specified maximum reduction is 3.0 amps and the incremental reduction in the maximum current limit is 0.5 amps per reduction. Once the specified maximum current limit reduction has been reached, the controller 150, at 423, maintains the reset maximum current limit at a value equal to the original preset maximum current limit less the specified maximum current limit reduction until refrigeration unit deactivation at 425.

The method may include the further step of resetting the reduced reset maximum current limit back to the original preset maximum current level if, upon deactivation of the refrigeration unit at 425, one or more conditions exist. In the exemplary embodiment of the method depicted, upon deactivation of the refrigeration unit 10, the controller 150 resets the then existing maximum current limit back to the original preset maximum current limit, also known as the default value, if any of the following conditions exist: the refrigeration unit is exiting operation in a pulldown mode; or the refrigeration unit has been deactivated in response to a shutdown alarm; or the refrigeration unit is entering a standby mode; or the ambient air temperature in which the refrigeration unit is operating has been less than the ambient air temperature set point for a second time period.

Figure 2C:
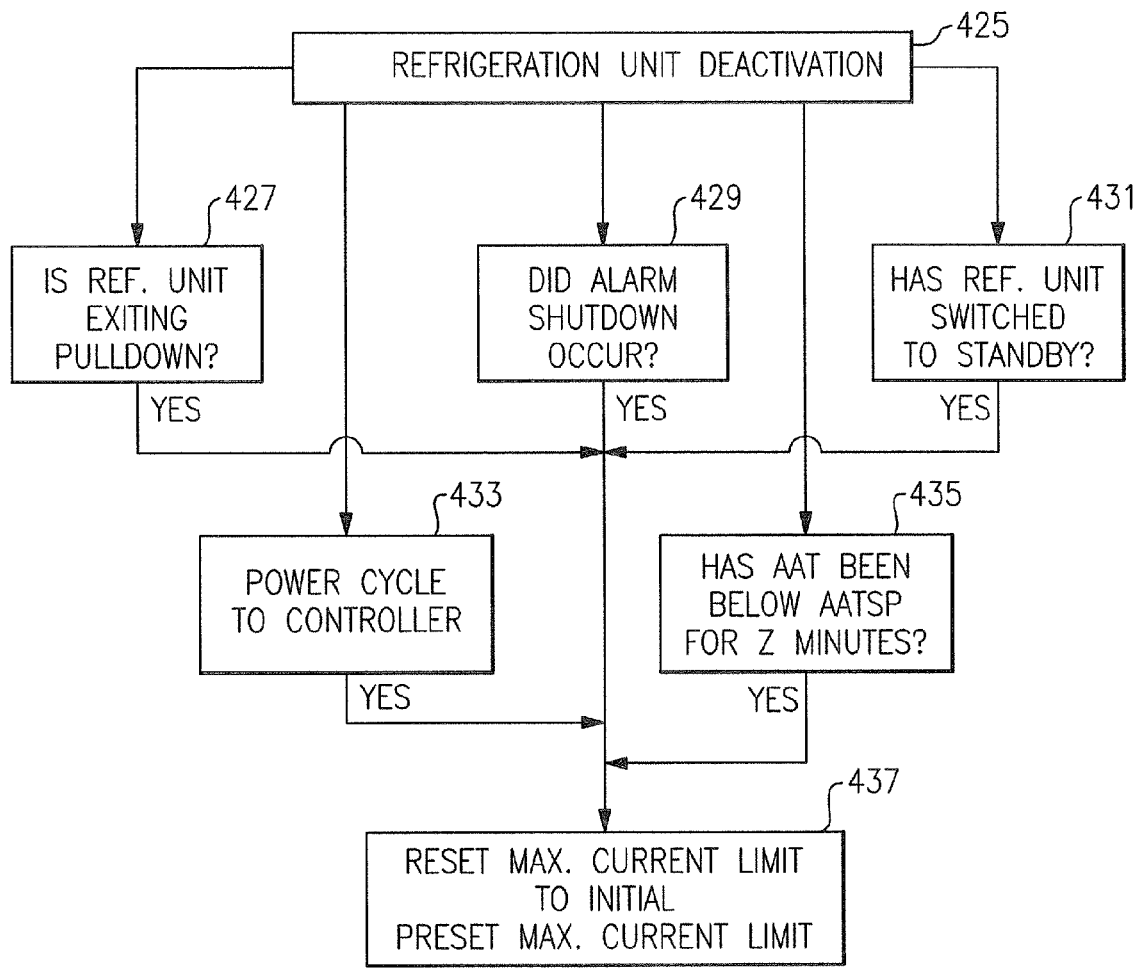

Referring now to FIG. 2c, at 427, if the refrigeration unit 10 was deactivated after exiting a pulldown mode, the controller 150 proceeds at 437 to reset the maximum current limit back to the original preset maximum current limit, also referred to as the default limit. At 429, if the refrigeration unit 10 deactivated in response to an alarm, i.e. an alarm shutdown occurred, the controller 150 the controller 150 proceeds at 437 to reset the maximum current limit back to the original preset maximum current limit. At 431, if the refrigeration unit 10 was switched to standby upon deactivation, the controller 150 proceeds at 437 to reset the maximum current limit back to the original preset maximum current limit. At 433, if a power cycle to the controller occurred upon deactivation of the refrigeration unit 10, the controller 150 proceeds at 437 to reset the maximum current limit back to the original preset maximum current limit. At 435, the controller 150 checks to determine whether the ambient air temperature (AAT) has been below the ambient air temperature set point (AATSP) for a specified period of minutes, for example five to ten minutes. If so, the controller 150 proceeds at 437 to reset the maximum current limit back to the original preset maximum current limit.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the method disclosed has been particularly shown and described with reference to the exemplary embodiment as illustrated in the drawing, it will be understood by one skilled in the art that various changes in detail may be effected therein without departing from the spirit and scope of the invention as defined by the claims. Therefore, it is intended that the present disclosure not be limited to the particular embodiment(s) disclosed as, but that the disclosure will include all embodiments falling within the scope of the appended claims.

We claim:

1. A method of operating a transport refrigeration unit having a compressor powered by AC electric current to limit current draw by the compressor, the method comprising:
   (a) determining whether an ambient temperature in which the refrigeration unit is operating has been greater than a set point ambient temperature for a first time period;
   (b) determining whether the refrigeration unit has been operating in a temperature pulldown mode for more than a time period, Z;
   (c) determining whether the AC electric current is equal to or exceeds a preset maximum current limit;
   (d) determining whether a time period between a last defrost cycle and a next previous defrost cycle is less than fifteen minutes; and
   (e) when the determination is yes in both of step (a) and step (b) and is also yes in at least one of step (c) and step (d), reducing the preset maximum current limit to a first reset maximum current limit.

2. The method as recited in claim 1 wherein the step of reducing the preset maximum current limit to a first reset maximum current limit comprises reducing the preset maximum current limit by 0.5 amps.

3. The method as recited in claim 1 further comprising the steps of:
   (f) starting a timer at a time t equals zero;
   (g) when the time t is equal to or greater than a first time t1, determining whether the AC electric current is equal to or exceeds a preset maximum current limit;
   (h) when the AC electric current is equal to or exceeds a preset maximum current limit, reducing the first reset maximum current limit to a second reset maximum current limit; and
   (i) restarting the timer at a time t equals zero.

4. The method as recited in claim 3 wherein the step of reducing the first reset maximum current limit to a second reset maximum current limit comprises reducing the first reset maximum current limit by 0.5 amps.

5. The method as recited in claim 3 further comprising the step of repeating steps (f) through step (i) until at the completion of the last step (h) the then reduced reset maximum current limit is three amps less than the preset maximum current level.

6. The method as recited in claim 5 wherein the reset maximum current level is reduced by 0.5 amps at each repetition of step (h).

7. The method as recited in claim 5 further comprising the step of resetting the reduced reset maximum current limit to the preset maximum current level when, upon deactivation of the refrigeration unit, the refrigeration unit is exiting operation in a pulldown mode.

8. The method as recited in claim 5 further comprising the step of resetting the reduced reset maximum current limit to the preset maximum current level when, upon deactivation of the refrigeration unit, the refrigeration unit has been deactivated in response to a shutdown alarm.

9. The method as recited in claim 5 further comprising the step of resetting the reduced reset maximum current limit to the preset maximum current level when, upon deactivation of the refrigeration unit, the refrigeration unit is entering a standby mode.

10. The method as recited in claim 5 further comprising the step of resetting the reduced reset maximum current limit to the preset maximum current level when, upon deactivation of the refrigeration unit, the ambient air temperature in which the refrigeration unit is operating has been less than the ambient air temperature set point for a second time period.

* * * * *